United States Patent [19]

Lederhos et al.

[11] 4,006,884
[45] Feb. 8, 1977

[54] METHOD AND APPARATUS FOR AERIAL WIRE STRINGING THROUGH AREAS WITHOUT VERTICAL ACCESS

[76] Inventors: Donald A. Lederhos, Rte. 1, Box 498, Bonners Ferry, Idaho 83805; L. E. Lindsey, 222 Vista Ave., Pasadena, Calif. 91107

[22] Filed: Sept. 22, 1975

[21] Appl. No.: 615,480

[52] U.S. Cl. .................................. 254/134.3 PA
[51] Int. Cl.² ...................................... B66D 1/36
[58] Field of Search ............ 254/134.3 R, 134.3 PA

[56] References Cited
UNITED STATES PATENTS

| | | | |
|---|---|---|---|
| 3,837,623 | 9/1974 | Chadwick | 254/134.3 PA |
| 3,868,089 | 2/1975 | Lindsey et al. | 254/134.3 PA |

*Primary Examiner*—Al Lawrence Smith
*Assistant Examiner*—Robert C. Watson

[57] ABSTRACT

A releasable connector is provided in an aerially placed pulling cable which is deposited in a catching device wherein the connector is disconnected and reconnected to connectors carried by the ends of a preplaced loop cable passing through the area to be strung, all responsively to forces of cable stringing. The particularly configured catcher provides a guiding through to support the pulling cable and its connector and upon appropriate positioning of the cable therein to release the connector so that the rearward portion of the pulling cable moves rearwardly by reason of its gravity bias to connect with one end of the preplaced loop cable and the forward end of the pulling cable moves forwardly to connect with the forward end of the loop cable to reform a continuous compound pulling cable with the loop cable incorporated therein. The loop cable is preplaced in a stringing block supported in the area through which it is desired that the pulling cable pass, with the loop cable ends passing from the serving block in a single loop to the catcher.

8 Claims, 15 Drawing Figures

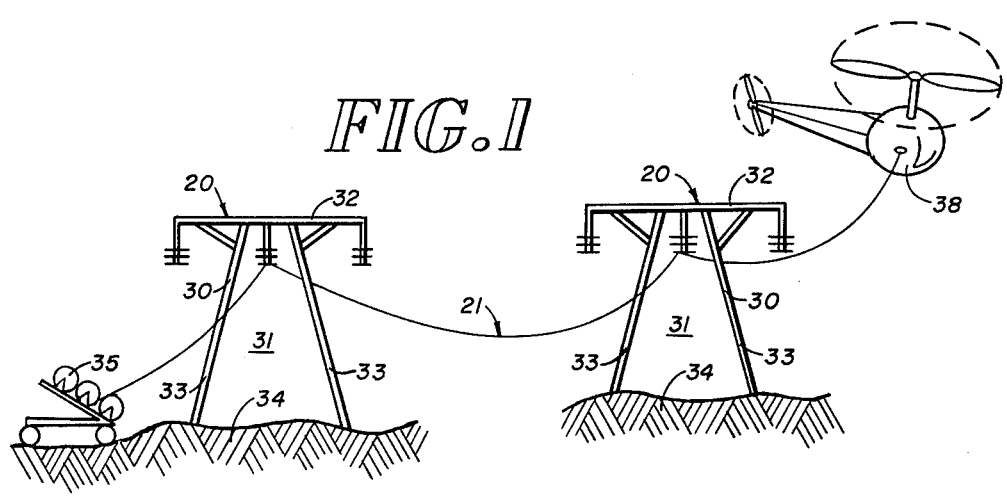
FIG. 1
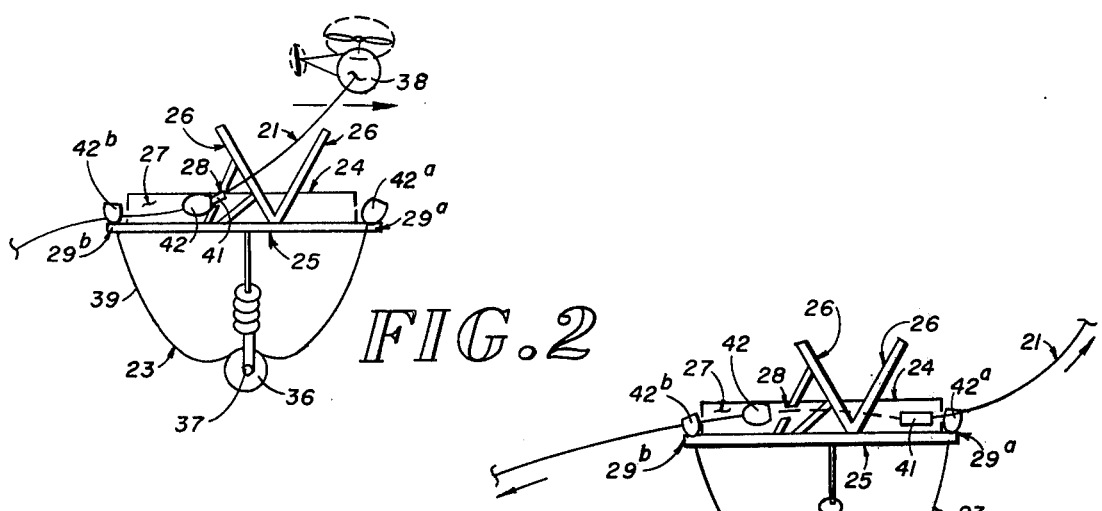
FIG. 2
FIG. 3
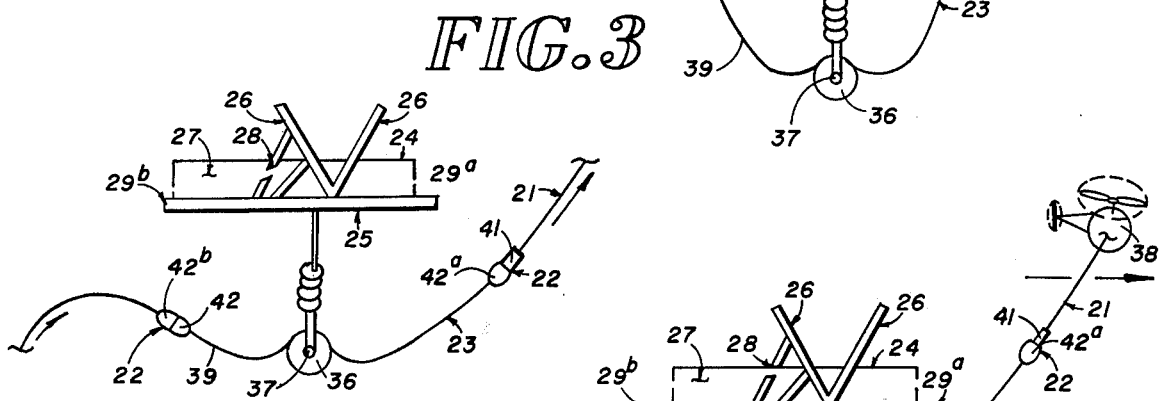
FIG. 4
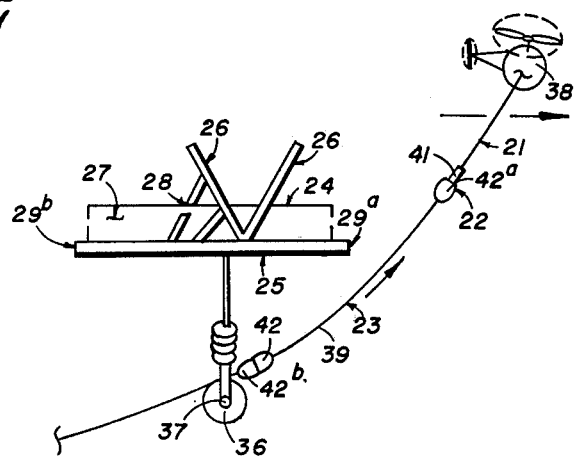
FIG. 5

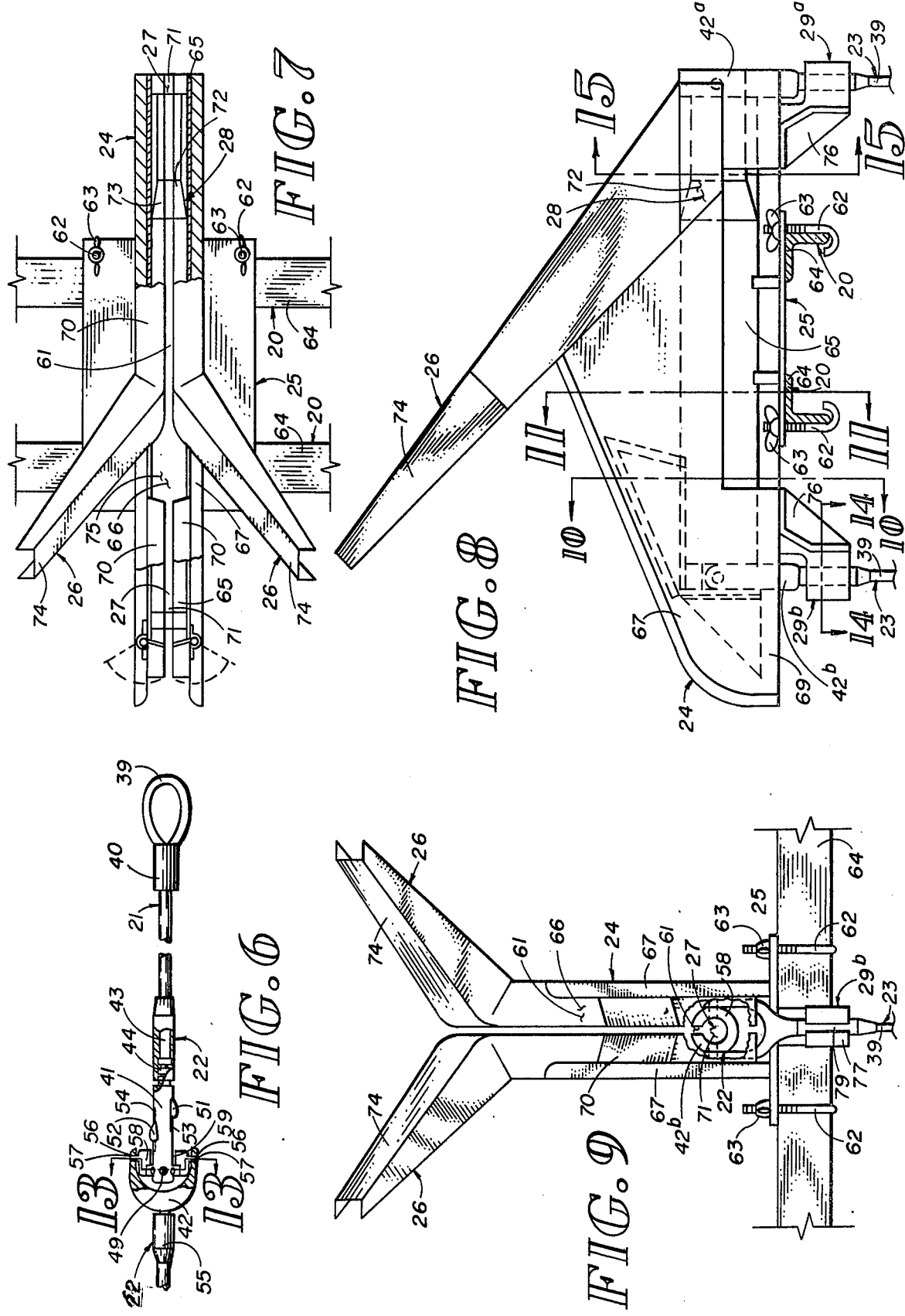

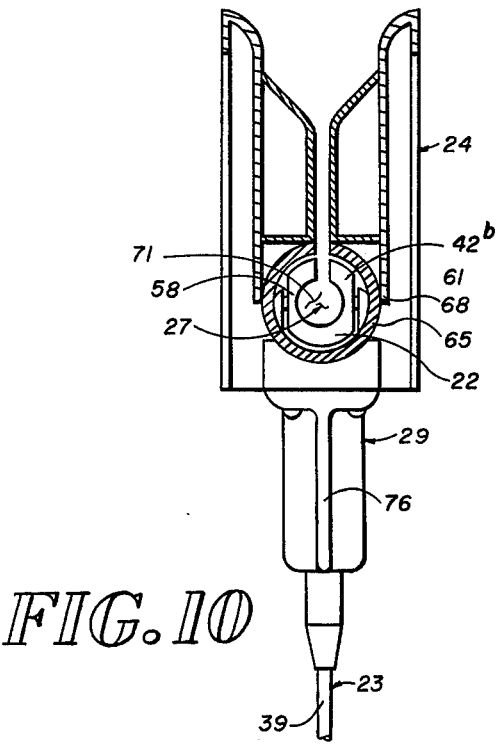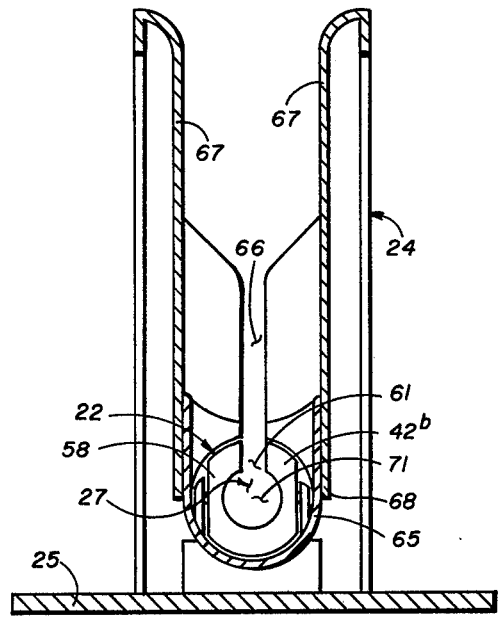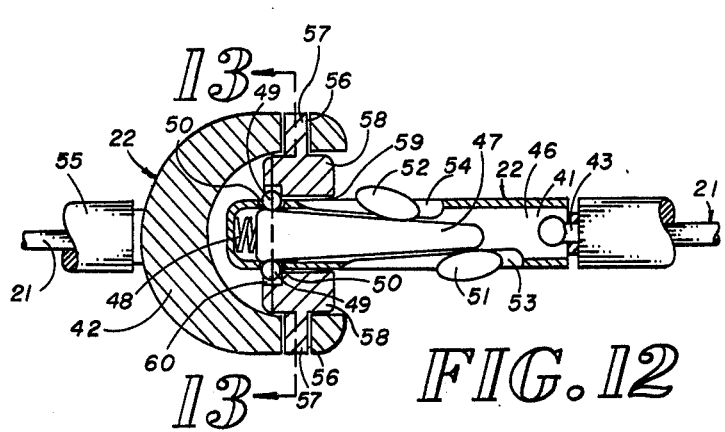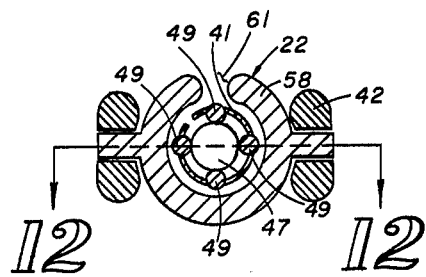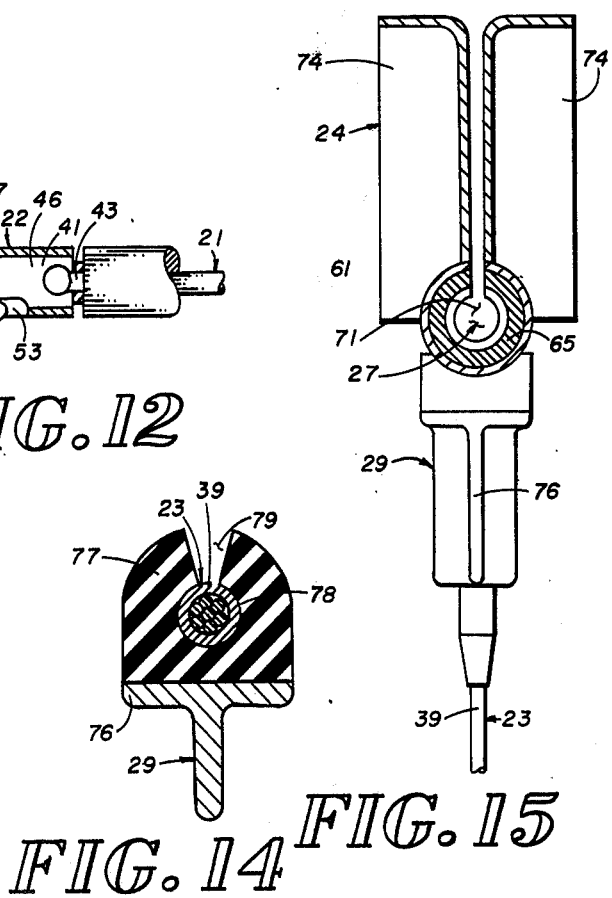

METHOD AND APPARATUS FOR AERIAL WIRE STRINGING THROUGH AREAS WITHOUT VERTICAL ACCESS

BACKGROUND OF INVENTION

RELATED APPLICATIONS

There are no applications related hereto now filed in this or any foreign country.

FIELD OF INVENTION

This invention relates generally to the aerial stringing of cables and more particularly to the continuous stringing of a pulling cable through areas having no vertical access from above by means of a loop cable interconnectable in the pulling cable.

DESCRIPTION OF THE PRIOR ART

In the construction of aerially supported cable lines, and particularly power transmission lines, the ultimate carrier is normally placed by firstly positioning a light pulling cable through a plurality of cooperating stringing blocks on adjacent supports and thereafter pulling relatively larger cables through the supports, if necessary, until the ultimate cable is placed. The field of art is technical, well developed and quite sophisticated in its present state.

In the recent past the use of helicopters to string pulling cables has become common especially because of the relative availability of helicopters, the ease and speed of cable placement with them and their lack of adverse environmental effects. It is not uncommon in current transmission line construction contracts for a covenant to require stringing of pulling cables by helicopter. The normal procedure to accomplish such stringing has heretofore been to maintain a light pulling cable, normally of a ⅜ inch aircraft type, on a freely rotatable spool on the ground at the initial point, to pick up one end of this cable with a helicopter, to move it along the course to be strung, and to deposit it at each adjacent tower site into some type of stringing block adapted to receive the cable. An early form of stringing block adapted for this type of operation is illustrated in U.S. Pat. No. 3,195,862 and later versions, as currently used, in U.S. Pat. No. 3,837,623 and 3,868,089 issued respectively to William H. Chadwick and L. E. Lindsay etal. This type of a stringing block is adapted particularly for use in areas where there is vertical access from above to allow cable placement, which in normal tower construction would be at the ends of support arms. The particular blocks and stringing methods associated therewith are not usable in areas where there is no such vertical access from above.

In general in modern day power transmission line tower construction, one transmission cable is oftentimes carried in a window, that is, an area which has a closed periphery thereabout, or by a horizontal support arm which has other structure thereabove that blocks vertical access from above. The practice heretofore existing to string cables through such areas has been to maintain a workman in the tower during the stringing operation so that the pulling cable may be detached from the supporting helicopter, manually placed in appropriate position by the workman in the tower and thereafter reattached to the helicopter for further stringing. This operation has been both a time consuming and quite dangerous one as it normally would require 20 to 30 minutes of both workman and helicopter time and would require the use of relatively uncontrollable cables which could easily knock a workman from a tower or dismember him.

Our instant invention seeks to alleviate these problems by providing an automatic, mechanically activated, stringing process wherein a preplaced loop cable is positioned through the area to be strung with its ends held in place in a catcher mechanism. The pulling cable is deposited in the catcher mechanism and appropriate mechanically releasable connectors break the pulling cable while in the catcher and automatically reconnect the loop cable ends therebetween to reform a continuous pulling cable passing through the area in question. Neither this method nor the particular apparatus disclosed for use therewith appear to be known for the same purpose in the prior art.

SUMMARY OF INVENTION

Our invention firstly provides a method or process whereby a pulling cable may be aerially strung through a window defined by a completely closed periphery or through an area having no vertical access from above, comprising the steps of:

placement and support of a stringing block in appropriate position to support a pulling cable in the area to be strung;

placement of a catcher device, having means to disconnect pulling cable connectors, above the stringing block in an area having access from vertically above;

preplacement of a loop cable having connectors on its ends operatively through the stringing block with both cable ends extending in a simple loop to the catcher;

movement of a pulling cable, having a mechanically releasable connector therein, from an initial point forwardly over the catcher and deposit of the connector in the catcher so that, responsively to cable motion, the pulling cable connector is disconnected and reconnected with the loop cable therebetween.

The apparatus to accomplish our stringing process comprises a catcher device and a particularly configured, disengagable connector. The connector we use has heretofore been known, in its essence at least, as a releasable pneumatic hose connector. It provides a smaller male end having a plurality of spaced peripherally protruding outwardly biased balls which may pass into and be releasably held in a larger yoke-like female part so long as the balls of the male part remain biased outwardly, but is released if the bias be removed from the balls. The female yoke part is novel in the fact that it may also engage and fasten to some degree another female yoke.

The catcher of our invention provides medially positioned upwardly extending catcher arms carried by an elongate body having an elongate medial channel or trough such that an aerially deposited cable is caught by the arms and moved downwardly by gravity into the medial channel. This channel in its middle part has a release mechanism to release the connector of the pulling cable. Each end part of the channel provides means of releasably supporting one end, respectively, of a loop cable connector so that as the rearward part of the pulling cable connector moves rearwardly in the catcher by rearwardly biasing gravity caused forces it becomes engaged with one loop end and the forward end of the pulling cable moves forwardly because of the tension upon it created by its helicopter support so that it engages the other end of the loop cable.

One particular form of each apparatus which has been found operative is disclosed herein, but undoubtedly other types of connectors and catching mechanisms might serve the purposes of our invention.

In providing our invention it is:

A principal object to create a continuous and instantaneous method or process of aerially stringing a pulling cable through a peripherally enclosed window or an area having no free access from vertically above by interconnecting a relatively shorter loop cable in the relatively longer pulling cable.

A further object to provide such a method or process that is activated and accomplished by natural forces or mechanical forces caused by the stringing helicopter.

A further object of our invention to provide a catcher device, for use with our method or process, to receive a releasable connector of a pulling cable, mechanically release that connector and reconnect each end to connectors carried on the ends of a loop cable to interconnect that loop cable into the pulling cable.

A still further object of our invention to provide a releasable cable connector for use with our method or process that provides the functions required.

A still further object of our invention to provide a process of the nature aforesaid that is of new and novel nature and useful apparatus therefore that is of simple and economic manufacture and of rugged and durable construction, both of which are well adapted for the uses and purposes for which they are intended.

Other and further objects of our invention will appear from the following specifications and accompanying drawings which form a part hereof. In carrying out the objects of our invention, however, it is to be remembered that its accidental features are susceptible of change in design and structural arrangement with only one preferred and practical embodiment being illustrated as required.

BRIEF DESCRIPTION OF DRAWINGS

In the accompanying drawings which form a part of this specification and wherein like numbers of reference refer to similar parts throughout:

FIG. 1 is a diagrammatic illustration of the cable stringing operation with a helicopter stringing one end of a pulling line from a ground supported reel over tower supports.

FIGS. 2, 3, 4 and 5 show progressively, in numerical order, the method or process of our invention involving preplacement of the interconnecting loop cable and catcher of the pulling cable; the disconnection of the pulling cable connector and reconnection with the loop cable connectors; the release of the cable from the catcher; and the continued pulling operation through the window of a tower structure.

FIG. 6 is a partially cut-away orthographic view of a connector in place on a pulling cable showing the details of structure and connection.

FIG. 7 is a top orthographic view of the catcher of our invention in place on a tower support, showing the catcher parts, their configuration and relationship.

FIG. 8 is an orthographic side view of the catcher of FIG. 7.

FIG. 9 is a rear orthographic view of the catcher of FIG. 7 taken on a plane looking forwardly.

FIG. 10 is an orthographic cross-sectional view of the catcher taken on the line 10—10 of FIG. 8 in the direction indicated by the arrows thereon.

FIG. 11 is a vertical cross-sectional view of the catcher taken on the line 11—11 of FIG. 8 in the direction indicated by the arrows thereon.

FIG. 12 is a cross-sectional view through the connector ring trunions of a releasable cable connector showing its various parts, their details and function.

FIG. 13 is a cross-sectional view of the cable connector of FIG. 12 taken on the broken line 13—13 in the direction indicated by the arrows thereon, which would be the same as that taken on the line 13—13 on FIG. 6.

FIG. 14 is a cross-sectional view of the connector holder of the catcher of FIG. 8 taken on the line 14—14 thereon in the direction indicated by the arrows.

FIG. 15 is a vertical cross-sectional view of the catcher of FIG. 8 taken on the line 15—15 thereon in the direction indicated by the arrows.

DESCRIPTION OF THE PREFERRED EMBODIMENT

Referring now to the drawings in more detail, it will be seen in FIG. 1 that our invention comprises generally elongate pulling cable 21 supported on a storage reel for carriage by a helicopter progressively to supporting structures 20 where it is deposited successively in catchers 24. The pulling cable provides a two piece connector 22 which allows connection of a relatively shorter loop 23 cable in the pulling cable. Catcher 24 provides a medial body carried on supporting means 25 with upwardly extending catcher arms 26 and defining therein cable channel 27 with its associated disconnect structure 28 and opposed connector holding structures 29, all related so that when connector 22 of the pulling cable be deposited in the catcher the connector will be disconnected and the loop cable reconnected therebetween.

For ease of description of our invention, the term 'forwardly' is hereinafter used to mean nearer to or moving toward the direction in which the pulling cable is strung, and the term 'rearwardly' is used to mean nearer to or moving in the opposite direction or toward the pulling cable storage device.

Support towers for modern transmission lines are of many and varied types within the range of essential limitations requiring the maintenance of transmission lines, at a spaced distance from each other and from the ground. Commonly, however, the structure of many such towers requires the stringing of carrier cable through a window, that is, an area defined by a continuous periphery thereabout, or in an area that has no vertical access from above as is the case with a tower having a lower shorter support arm with a longer upper arm extending laterally therebeyond. A typical tower 30 of the first type is diagrammatically illustrated in FIG. 1. This tower defines a window 31 between its upper cross-arm 32, cooperating vertical supports 33 and earth surface 34. Such structures with limited access from above are those with which our invention is concerned.

In the process of stringing transmission cables to be supported by such towers, commonly pulling cable 21 is first strung in appropriate fashion over stringing blocks 36 carrying either singular or plural sheaves 37 and supported on the towers in approximately the ultimate conductor support position. The pulling cable is commonly carried on a reel-type storage device 35 supported on the earth at the initial point at which stringing is to start. The first pulling cable to be positionally established is normally of ⅜ inch aircraft type steel wound cable or possibly braided nylon of similar capacity. Up to approximately five miles' length of pulling cable is stored on the reel of storage device 35 to be payed therefrom by pulling helicopter 38.

The pulling cable of our invention is provided in its forwardmost part with loop 39 formed by the cable end in cooperation with commercial wedge type loop fastening device 40. Somewhat inwardly of the loop fastening device is connector 22 providing male body part 41 releasably carried in female yoke part 42. The male body part provides medial channel 43 to receive the end portions of cable 21 which is fastened therein by annular wedge-type fastening structure 44, again as known in the cable arts and as particularly seen in FIG. 6.

Referring to FIGS. 12 and 13, it is seen that the end part of male body 41 is an elongate cylinder defining internal cylindrical chamber 46 slidably carrying therein elongate conic wedge 47 biased by compression spring 48 to an axially inward position (away from the body end). Plural spherical balls 49 are positioned in holes 50, with such configuration that the balls have just slightly less than a hemisphere projecting externally of the surfaces of male body 41, in a ring perpendicular to the axis of the body. The balls are biased to a normally outward position by action of conic wedge 47 on their inner surfaces. Slightly axially inwardly of balls 49 release nubbins 51, 52 are provided to extend through appropriate holes 53, 54 in male connector body 41 and be slidably carried therein, so that if the nubbins 51, 52 be moved axially toward the end of male body 41, the bias of conic wedge 47 will be relieved and balls 49 may move radially inward into connector body 41. Holes 53, 54 are so configured that motion of either nubbin 51, 52 will not alone be sufficient to release balls 49 from a fastening position, but rather to release the balls there must be appropriate motion of both nubbins simultaneously.

This double release feature is not essential to our invention as a single release nubbin would be operative, but it provides a safety feature preventing a premature accidental release of the pulling cable connector that might be caused by one nubbin accidently striking some object.

Female yoke part 42 of fastener 22 provides a U-shaped body structurally communicating with elongate cylindrical cable fastener 55 to attach the device to the rearward end of the pulling cable in the same fashion as the male end. The outer parts of the U-shaped arms of yoke 42 define opposed cooperating bearing holes 56 carrying trunions 57 of fastening ring 58 to provide a pivotal mounting of the fastening ring in yoke 42. Annular fastening ring 58 defines medial cylindrical hole 59 of a size appropriate to slidably receive body 41 of the male connector and on one side provides internal annular groove 60 configured to connectively receive balls 49 of male body 41. A segment is removed from fastening ring 58 to provide channel 61 extending therethrough approximately at right angles to the trunions and of appropriate size and configuration to allow ready passage of pulling cable 21 therethrough.

With this structure female yoke 42 will receive and releasably hold male body 41 and by reason of the particular structure and configuration of the connectors, the male portion may be held in the female portion when placed from either side. Cable fastener 55 has an internal cable channel wherein the pulling cable is maintained by a commercially known annular wedge-type fastener; its external configuration is required to be the same as that of the male connector and its cable facing end shaped as a truncated cone to allow cable fastening as hereinafter specified. This general type of connector fastening structure is commonly known in the coupling arts as a pneumatic hose fastener.

Catcher 24 is structurally supported by planar support plate 25 having plural holes to receive "J" bolts 62, adjustably positionable by taps 63 to releasably carry the catcher structure on structural elements 64 of supporting tower structure 20. Cable channel 27 is an elongate, open top trough defined by channel element 65. The channel element defines the trough over some distance with an appropriate cross-sectional configuration to slidably receive both the parts of pulling cable connectors 22. The medial part 66 of the cable channel, immediately rearwardly of catching arms 26, provides an enlarged opening in its upper part to receive cable connector 22 from vertically above. Vertically upwardly extending side elements 67 are provided on each side of channel element 65 to further define the upward extension of the open topped channel for some substantial distance upwardly beyond the top of channel element 65. The side elements are normally formed of rigid sheet material to substantially the configuration illustrated and are structurally joined at 68 to the lateral surfaces of channel element 65 and supported in their lower extension 69 by structural joinder to support plate 25. In both the forward and rearward portions of the cable channel there are provided internal fillets 70 extending inwardly from each inner surface of the opposed side elements 67 to define therebetween cable channel 71 of similar but slightly greater width than that of pulling cable 21. This cable channel is designed for vertical access of the pulling cable to the cable channel over the entire length of catcher element 24. Internal fillets 70 again are preferably formed of rigid sheet material such as metal to a smooth configuration as illustrated so that a cable will readily pass downwardly therebetween. The internal fillets are structurally joined to the inner surface of side elements 67 and to the upper edges of channel element 65 to form a rigid structure in combination therewith.

The forward part of channel element 65 is formed with conical constriction 72 to provide disconnect structure 28 for the pulling cable connector. This constriction is configured so that as the male portion of connector 22 enters the channel its release nubbins 51, 52 will be moved rearwardly and inwardly to cause the element to release from its theretofore connected female yoke 42. Preferably inner surface 73 of this truncation is formed of some resilient material having a sufficient coefficient of friction to accomplish its purpose, such as hard rubber or softer plastic.

Catching arms 26 provide similar opposed beam-like elements 74, again preferably formed of sheet metal, configured as illustrated, and structurally joined to the upper medial portions of opposed side elements 67 to extend at an angle laterally outwardly and rearwardly therefrom. The elements 74 are spaced apart an appropriate distance to maintain clear vertical access of pulling cable from above the catcher to cable channel 71 and are positioned in the axially medial part of the side elements, immediately forwardly of the forwardmost portion of enlarged connector orifice 75 defined between the forward and rearward fillets 70. With this structure, then, the configuration of opposed catching arms 26 is such that pulling cable connector 22 will not pass forwardly through the channel between the lower portions thereof and thusly as a cable enters between the catcher arms it may move by action of gravity downwardly and the connector will be caught on the rearward side of the catching arms from whence it may pass further downwardly through connector entry orifice 75 while the cable passes downwardly through cable channel 71 until both pulling cable and connector are supported in the cable channel against further downward displacement by the lower portion of channel element 65.

Connector holding structure 29 as seen in the drawings of FIGS. 8, 14 and 15 provides similar opposed brackets 76 depending from structural communication with the lower extrusion of side element 67 immediately inwardly adjacent each end of cable channel 27. Each bracket structurally carries a connector holder, having structural joining portions 77 communicating with the bracket, and defining medial vertically oriented cylindrical holding channel 78 having communication through the holding element by access channel 79 defined by the removal of a segment of the holding element. Preferably these holding elements are formed of some structurally durable, resilient material such as hard rubber and the removal channels are so defined that each points away from the catcher structure in the direction of the stringing line. Holding channels 78 are configured to snugly hold with some deformity the similar cable fastening portions of the female and male connector parts 42, 41 but yet to release them upon application of some appropriate predetermined dislodgment force. Such holding devices are known in the cable handling art and their parameters may be readily determined by known engineering means.

Window loop cable 23 of our invention comprises a length of pulling cable 80 appropriate to extend from the catcher through stringing block 39 in window 31 of tower 30 to be serviced and thence back to the catcher. Each end of this cable is provided with female parts 42 of connector 22 previously described. The length of these cables is not critical and may vary appropriately with the required parameters of any given situation.

Having thusly described the structure of our invention, its operation may now be understood.

Normally when a pulling line is strung it will be strung over several adjacent towers in one successive and relatively continuous operation to conserve relatively expensive helicopter time. For convenience and simplicity the operation will be described as required for the stringing of a single tower; however, the same operation is merely repeated to string a plurality of adjacent towers.

Firstly, a catcher structure, constructed according to the foregoing specification, is releasably positioned on the upper part of the tower to be strung in a position where it has access for a helicopter placed pulling cable from vertically above. The catcher is maintained in position by appropriate manipulation of "J" bolts 62 and their taps 63 to fasten support plate 25 to tower structural element 64, either permanently a part of the support tower or temporarily affixed for stringing purposes. The catcher is positioned with catcher arms 26 extending rearwardly (in the direction of the pulling cable spool) and with the cable channel 27 substantially aligned parallel with the ultimate transmission line direction. Stringing block 36 is then positioned in tower window 31 through which transmission cable is ultimately to be strung. Normally the stringing block will be positioned upon the cable supporting end of insulators already placed in ultimate operative position but this positioning is not essential to our invention and may be carried out according to the established precepts of the prior art relating to cable stringing. Window loop cable 23 of appropriate length is then established with its two female connector parts 42 in the two connector holding blocks 29 of the catcher, and its cable therebetween extending in a single loop through the tower window and stringing block. If a plurality of towers are to be strung at the same time, each is rigged in the same fashion.

Pulling cable 21 of appropriate length is preestablished on a free wheeling reel-type storage device 35 with loop 39 in its forward end part and connector 22, having the male part forward, somewhat rearwardly adjacent the loop. The forward loop end of the pulling cable is then picked up by helicopter 38, and moved forwardly off the reel of storage device 35 and along the ultimate transmission cable course. As the first tower to be strung is approached the cable is deposited from above, by appropriate helicopter manipulation, between catching arms 26 of catcher 24 with connector 22 rearwardly of those catching arms. The cable is lowered and brought forward by the helicopter until the pulling cable connector is immediately rearward of the rearward facing surface of the catching arms and when in this position the tension is slightly relaxed on the pulling cable so that it may move vertically downwardly, the cable moving downwardly through cable channel 71 and connector 22 moving downwardly through connector 75, until the entire cable is in cable channel 27 and supported from further downward displacement by the bottom of channel element 65.

The cable thusly positioned is then moved slightly forwardly by helicopter manipulation until the forward male part 41 of connector 22 enters constriction 72 of disconnect structure 28. At this point release nubbins 51, 52 of male connector 41 are moved rearwardly by the inner surface of constriction 72 to move wedge 47 rearwardly against its bias and thusly allow balls 49 to move radially inwardly and release the male part of the connector from the female part. When this release occurs the forward male part 41 of the pulling cable connector 22 will move forwardly through cable channel 27 by reason of gravity caused cable bias or helicopter action. Since the pulling cable rests in the bottom of the cable channel it will have previously entered through channel 61 of fastening ring 58 of forward female yoke 42 so that as the forward portion of the pulling cable continues its forward course of motion male connector 41 will pass into prepositioned forward female yoke 42a of the window loop cable and become fastened therein or more properly, prevented from passing therethrough. Upon its becoming fastened, the further forward motion of the forward part of the pulling cable will dislodge the window loop cable's forward female connector 42 from forward connector holding structure 29a and allow it to fall free thereof, with the loop cable forwardly of the stringing block being supported only by the stringing block.

At the same time gravity created tension in the rearward portion of the pulling cable will bias female yoke 42 of that cable rearwardly through cable channel 27 until it comes into contact with rearward female connector 42b of the window loop cable, prepositioned and carried in rearward connector holding structure 29b. The elongate cylindrical fastening portion of the pulling cable's rearward female connector is then pulled into the medial hole defined in the fastening ring of the rearward female connector of the window loop cable, and is there held by rearward tension of the pulling cable since the pulling cable can't pass either axially or radially through the fastening ring of the rearward window loop cable connector because of the relative sizes of the elements. The rearward bias on the rearward portion of the pulling cable also causes the rearward female connector 42b of the window loop cable to be released from rearward connector holding structure 29b and fall therefrom to be supported only by the stringing block.

Thusly the pulling cable is again a compound pulling entity with the window loop cable interconnected between the two parts of the original pulling cable connector and the whole supported over stringing block 36 of window 31 of the tower 30 being serviced. The forwardmost pulling cable connector joinder is of the same nature and condition as the connector joint in the original pulling cable. The pulling cable may be then moved forwardly, with the rearwardmost connection between window loop cable and pulling cable passing over stringing block 36, and the cable moved forwardly to repeat the operation with the forwardmost connection at the next tower to be serviced.

It is to be noted from the foregoing description that in using our process of wire stringing it is not necessary that any operators be in the tower being strung during the stringing operation, thus alleviating the possibility of injury to tower workman.

It is further to be noted that the stringing operation that requires helicopter time is accomplished very rapidly without any helicopter waiting time for manual positioning of cables through window stringing blocks. This is a major economic advantage of the methodology of our invention as helicopter time is relatively expensive and the instant invention reduces such required time as compared to the known processes by a factor of two or three, depending somewhat upon the skill of the particular helicopter pilot involved.

It is further to be noted that our invention is quite compatible and may be used with the line stringing methods and equipment common in the present day industry, the only additional requirements being a plurality of reusable catchers, reusable window cables and an appropriate connector in the pulling cable.

The foregoing description of our invention is necessarily of a detailed nature so that a specific embodiment of it may be set forth as required, but it is to be understood that various modifications of detail, rearrangement and multiplication of parts might be resorted to without departing from the spirit, essence or scope.

Having thusly described our invention, what we desire to protect by Letters Patent, and what we claim is:

1. A method of aerially stringing a cable through an area of a support having no free access from above, comprising, in combination:
   the placement of a loop cable in a simple loop through the area of the support having no access from above with the ends of the loop cable extending to a releasable support in an area having free access from vertically above;
   the transport of a stringing cable to the point of releasable support of the ends of the loop cable;
   the interconnection of the loop cable in the pulling cable to form a compound unitary pulling cable; and
   the release of the ends of the loop cable from their releasable support.

2. The process of aerially stringing a cable through a stringing block carried by a support in a window defined by a completely closed periphery, comprising, in combination:
   the placement of a window loop cable in a simple loop through the stringing block with its ends communicating to an area outside the window to form a simple loop;
   the transport of a pulling cable to the ends of the window loop cable; and
   the interconnection of the window loop cable in the pulling cable to form a compound pulling cable movably supported by the stringing block.

3. The process of aerially stringing cable through a stringing block carried by a support in a window defined by a completely closed periphery, comprising, in combination:
   the placement of a window loop cable having connectors at each end in a simple loop through the stringing block with the connectors at each end communicating to a catcher in an area outside the window to form a simple loop;
   the transport of a pulling cable having a medial releasable connector to the ends of the window loop cable; and
   the interconnection of the window loop connectors with the pulling cable connectors to form a compound pulling cable with the loop cable interconnected therein and movably supported by the stringing block.

4. A catcher for the aerial stringing of cable through a window defined by a closed periphery in a supporting structure comprising, in combination:
   a rigid support having means for releasable joinder to a supporting structure;
   an elongate cable channel defined by rigid peripheral elements carried on the rigid support to allow pulling cable access from vertically above and having an enlarged medial connector orifice to receive a pulling cable connector and support the pulling cable and connector for sliding motion therethrough;
   a disconnect structure, forwardly of the medial connector orifice, having means to release the pulling cable connector upon entry therein; and
   connector holding means at each end of the cable channel, supported by the rigid peripheral elements, to releasable hold connectors at each end of the window loop cable so that as the pulling cable connectors pass out of the cable channel at each end each is interconnected with a loop cable connector at that end of the cable channel.

5. The catcher of claim 4 further characterized by:
   similar, paired opposed catching arms positioned immediately forwardly of the enlarged connector orifice to extend upwardly and laterally outwardly and rearwardly therefrom, the catching arms being spaced in their lower portions to allow passage of the pulling cable but not the pulling cable connector, therebetween.

6. The catcher of claim 4 further characterized by:

the disconnect structure comprising an annular constriction in the cable channel to cause mechanical force responsive to forward connector motion to disconnect a forward male connector member from a rearward female yoke member.

7. A two part releasable cable connector for the aerial stringing of cable through a window defined by a closed periphery in a supporting structure, comprising, in combination:

a forward male part having means to connect to a cable and formed as a cylinder with plural radially movable balls carried in plural spaced annularly arrayed holes therein, the balls being biased to protrude from the external surface of the cylinder but being movable radially inwardly responsive to motion of at least one release nubbin protruding outwardly from the male connector; and, a rearward female yoke member having means to connect to a cable and pivotably carrying a fastening ring defining a medial orifice to releasably hold the male member and prevent its passage therethrough when the balls of the male member are in biased position, the fastening ring having a channel communicating therethrough to allow passage of a pulling cable.

8. The connector of claim 7 wherein female yoke member is further characterized by:

a smaller cable connecting portion, extending toward the supporting cable from the larger yoke member, configured to slidably enter and nicely fit within the medial orifice of the fastening ring of another female yoke member.

* * * * *